United States Patent [19]
Dauvergne

[11] Patent Number: 5,273,487
[45] Date of Patent: Dec. 28, 1993

[54] HEATING AND/OR AIR CONDITIONING APPARATUS FOR THE CABIN OF A MOTOR VEHICLE, HAVING AIR FILTER MEANS

[75] Inventor: Jean Dauvergne, Allée Maryse Hilsz, France

[73] Assignee: Valeo Thermique Habitacle, Le Mesnil-Saint-Denis, France

[21] Appl. No.: 995,786

[22] Filed: Dec. 23, 1992

[30] Foreign Application Priority Data

Dec. 23, 1991 [FR] France .................. 91 16022

[51] Int. Cl.⁵ .............................................. B60H 3/06
[52] U.S. Cl. ................................... 454/139; 454/158
[58] Field of Search ............... 454/139, 158; 55/467, 55/471

[56] References Cited

U.S. PATENT DOCUMENTS

| | | | |
|---|---|---|---|
| 4,319,519 | 3/1982 | Pärsson | 454/158 |
| 4,365,541 | 12/1982 | Marques et al. | 454/158 X |
| 4,531,453 | 7/1985 | Warman et al. | 454/158 X |
| 5,004,487 | 4/1991 | Kowalczyk | 55/269 |

FOREIGN PATENT DOCUMENTS

| | | |
|---|---|---|
| 3912013 | 10/1990 | Fed. Rep. of Germany . |
| 105817 | 6/1983 | Japan .................. 454/158 |
| 244912 | 9/1989 | Japan .................. 454/139 |

OTHER PUBLICATIONS

Patent Abstract of Japan, 60–004,412, Jan. 1985, Japan.
Patent Abstract of Japan, 62–184,919, Aug. 1987, Japan.

*Primary Examiner*—Harold Joyce
*Attorney, Agent, or Firm*—Morgan & Finnegan

[57] ABSTRACT

A heating and/or air conditioning apparatus for the cabin of a motor vehicle includes an air blower unit which is supplied with fresh air from outside the vehicle through a fresh air admission duct, and with air from within the cabin of the vehicle for recycling through the apparatus, this air being introduced through a recycling air admission duct. The apparatus also includes adjusting means for adjusting the proportions of the flows of air through the two respective admission ducts. A deodorant filter is placed removably in the recycling air admission duct.

6 Claims, 1 Drawing Sheet

HEATING AND/OR AIR CONDITIONING APPARATUS FOR THE CABIN OF A MOTOR VEHICLE, HAVING AIR FILTER MEANS

FIELD OF THE INVENTION

This invention relates to apparatus for the heating and/or air conditioning in the cabin of a motor vehicle, of the kind in which the apparatus includes air filter means.

BACKGROUND OF THE INVENTION

Apparatus of this type is known that includes an air blower unit, which is supplied with air from outside the vehicle through a fresh air admission duct, and which is further supplied with air drawn from inside the cabin of the vehicle so that this latter air is recycled through the apparatus. Such known apparatus also includes adjusting means for adjusting the relative flows of air through the two inlet ducts. It further includes air filtering means. The adjusting means usually comprise a valve, or a plurality of valves, which are arranged to assume, selectively, either a first or "fresh air" position or a "recycle" position. In the fresh air position, the recycling air admission duct is closed off, so that only fresh air from outside the vehicle is able to be passed to the blower unit. In the recycle position, the reverse is true, the fresh air admission duct being closed off so that the only air reaching the blower unit is that drawn from inside the vehicle. The adjusting means are usually arranged to be able to adopt various intermediate positions so that fresh air and recycling air can be mixed.

In normal operation of the vehicle, the user adjusts the adjusting means to the "fresh air" position, so that only fresh air from outside the vehicle is admitted into the cabin. It is only under exceptional circumstances, that is to say when the vehicle is travelling through a zone in which the air is particularly polluted, that the adjusting means are put into the "recycle" position so that fresh air from outside the vehicle is prevented from entering the cabin.

It is already known, from the specification of European published patent application No. EP 380453A, to provide an apparatus of the above type which further includes a single filter arranged at the confluence of the fresh air admission duct and the recycling air admission duct. This filter is designed simply for filtering the fresh air from outside. In practice, it is in the form of a particle filter, i.e. a filter which is adapted to trap particles of different kinds which are in suspension in the atmosphere outside the vehicle; air that is recycled wholly within the vehicle is not subjected to such a filtration process.

Other apparatuses are known which have a general structure similar to that in the European patent specification mentioned above, but which also include a single filter arranged at the confluence of the two air admission ducts for the purpose of filtering both the fresh air from outside the vehicle and the air being recycled within the vehicle. In this case, this single filter is a filter of a deodorant type which contains an absorbent material of the active carbon type, for absorbing or purging the odours which are carried by the air passing through the filter. Given that this deodorant filter acts indiscriminately on both the fresh air and the internal air being recycled, it is in permanent operation, and thus tends to become very rapidly dirty and saturated. Since this filter is working essentially in the "fresh air" position, when the apparatus is adjusted into the "recycle" position the filter is accordingly no longer particularly effective for the purpose of treating the air being recycled within the vehicle.

In addition, the filtering arrangements of known types mentioned above have the disadvantage of being expensive, and, more importantly, they are unable to treat effectively and permanently all of the air flow that passes through the heating and/or air conditioning installation.

DISCUSSION OF THE INVENTION

A principal object of the invention is to overcome the above mentioned drawbacks.

According to the invention, an apparatus for heating and/or air conditioning the cabin of a motor vehicle, comprising: an air blower unit which is fed with air selectively through a fresh air admission duct for admitting air from outside the vehicle, and through a recycling air admission duct for admitting air from the cabin of the vehicle; a chamber in which the air blower unit is mounted and which has a fresh air inlet and a recycling air inlet; adjusting means for adjusting the air flow through the two said admission ducts; and air filter means comprising an air filter placed in the recycling air admission duct and mounted removably on the recycling air inlet, is characterised in that the air blower unit comprises a housing, having an air inlet and an air outlet and containing within it a blower rotor and an electric motor for driving the blower rotor, and in that the casing is disposed within the said chamber of the apparatus in such a way that the motor of the air blower unit is accessible through the recycling air inlet when the air filter is removed.

Thus, when the user experiences a bad smell, he can at once shut himself off from this smell if, as is usually the case, it is coming from outside the cabin of the vehicle. All he has to do is to adjust the apparatus into its "recycle" position, in which the apparatus is able to treat the pollution introduced into the cabin by means of the filter arranged on the recycling air admission duct. Accordingly, this filter is only in use when the apparatus is in the "recycle" position, that is to say under relatively exceptional conditions. Since the filter is therefore hardly ever used, it only becomes dirty and saturated very slowly, and accordingly has a long useful life.

In addition, the eventual replacement of the deodorant filter, and access to the motor blower unit for maintenance and/or repair, are both facilitated by the arrangement in accordance with the invention.

The deodorant filter preferably comprises a replaceable cartridge containing an absorbent material of the activated carbon type, the cartridge being so designed as to fit in the recycling air inlet of the chamber.

Preferably, the chamber comprises an air passage which communicates firstly with the recycling air inlet of the chamber, and secondly with the air inlet of the casing of the blower unit, with the apparatus further including a valve for controlling and adjusting the flow of air being recycled within the vehicle, together with another valve for controlling and adjusting the flow of the fresh air admitted from outside the vehicle.

An apparatus according to the invention is particularly compact, with the air blower unit being integrated within the chamber, and is at the same time easy to dismantle for the purposes of repair or maintenance.

The recyling air inlet preferably includes an internal engagement surface which is fitted with a seal, and which also includes retaining means for holding the cartridge in position, this retaining means comprising for example at least one snap-fitted clipping element.

According to another preferred feature of the invention, the apparatus further includes a particle filter and a second deodorant filter, arranged in the fresh air admission duct. Since this second deodorant filter is distinct from the deodorant filter fitted in the recycling air inlet duct, then even if it is saturated, it does not affect the correct operation of the deodorant filter which is provided for filtering the air being recycled.

According to a further preferred feature of the invention, the apparatus also includes a suitable sensor which is adapted to act on the air adjusting means through an appropriate motor such as a servo motor.

Preferred embodiments of the invention will be described below, by way of example only and with reference to the accompanying drawings.

DESCRIPTION OF PREFERRED EMBODIMENTS OF THE INVENTION

Figure 1:
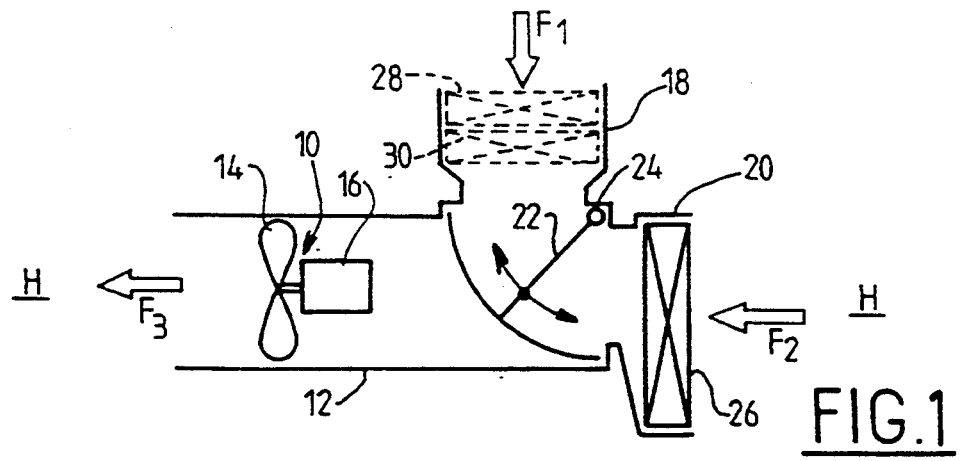
FIG. 1 is a diagrammatic illustration of a heating and/or air conditioning installation for a motor vehicle having air filter means, in accordance with the invention.

Reference is first made to FIG. 1, which shows a heating and/or air conditioning apparatus for the cabin of a motor vehicle. This apparatus includes an air blower unit 10, which is mounted within a chamber 12 and which includes a blower rotor 14 and an electric motor 16 driving the rotor 14. The air blower unit 10 is fed, via an admission duct 18, with fresh air drawn from outside the cabin H of the vehicle. It is also fed, through a second air admission duct 20, with air which is drawn from inside the cabin H and which is therefore recycled. The ducts 18 and 20 convey to the blower unit 10, respectively, fresh air as indicated by the arrow $F_1$ and air for recycling as indicated by the arrow $F_2$.

The apparatus also includes a regulating valve 22 which is pivotally mounted about an axis 24 and which is displaceable in the junction zone between the admission ducts 18 and 20, immediately upstream of the air blower unit 10. The valve 22 is arranged to cover selectively one or other of the two admission ducts 18 and 20, in two respective extreme positions. These are a first position in which the recycling admission duct 20 is closed, so that only fresh air through the admission duct 18 can be admitted; and a second extreme position in which the fresh air admission duct 18 is closed, so that only air from the cabin, via the admission duct 20, can be delivered to the blower unit. The valve 22 is also able to assume a multiplicity of intermediate positions between these two extreme positions.

The air blower unit, fed in this way through one or other, or both, of the admission ducts 18 and 20, sets up an air stream which is delivered into the cabin H of the vehicle in the direction indicated by the arrow $F_3$. The recycling air admission duct 20 is provided with a deodorant filter 26 in the form of a replaceable cartridge, containing an absorbent material of the active carbon type.

When the apparatus is adjusted into the "fresh air" position, which is its commonest position in use, the regulating valve 22 closes the admission duct 20, so that the blower unit 10 delivers only fresh air into the cabin H. If the user detects a bad smell that appears to come generally from outside the vehicle, he adjusts the valve so that the apparatus is then in the "recycle" position, in which the valve 22 closes off the fresh air admission duct 18. The blower unit can then only deliver into the cabin recycled air drawn from within the cabin itself. The filter will now act to trap odours that may be contained within the cabin.

In a more developed embodiment of the invention, the fresh air admission duct 18 is provided with a particle filter 28 and a deodorant filter 30 (both of which are shown in broken lines in FIG. 1). In this way filtration of the fresh air stream is effected by filter means, especially the deodorant filter 30, that are independent of the deodorant filter 26. The tendency of the deodorant filter 26 to become saturated too soon is thereby reduced. This tendency existed, as has been mentioned, in apparatuses of the prior art having a single filter for filtration of both fresh air and recycling air through the same filter.

Figure 2:
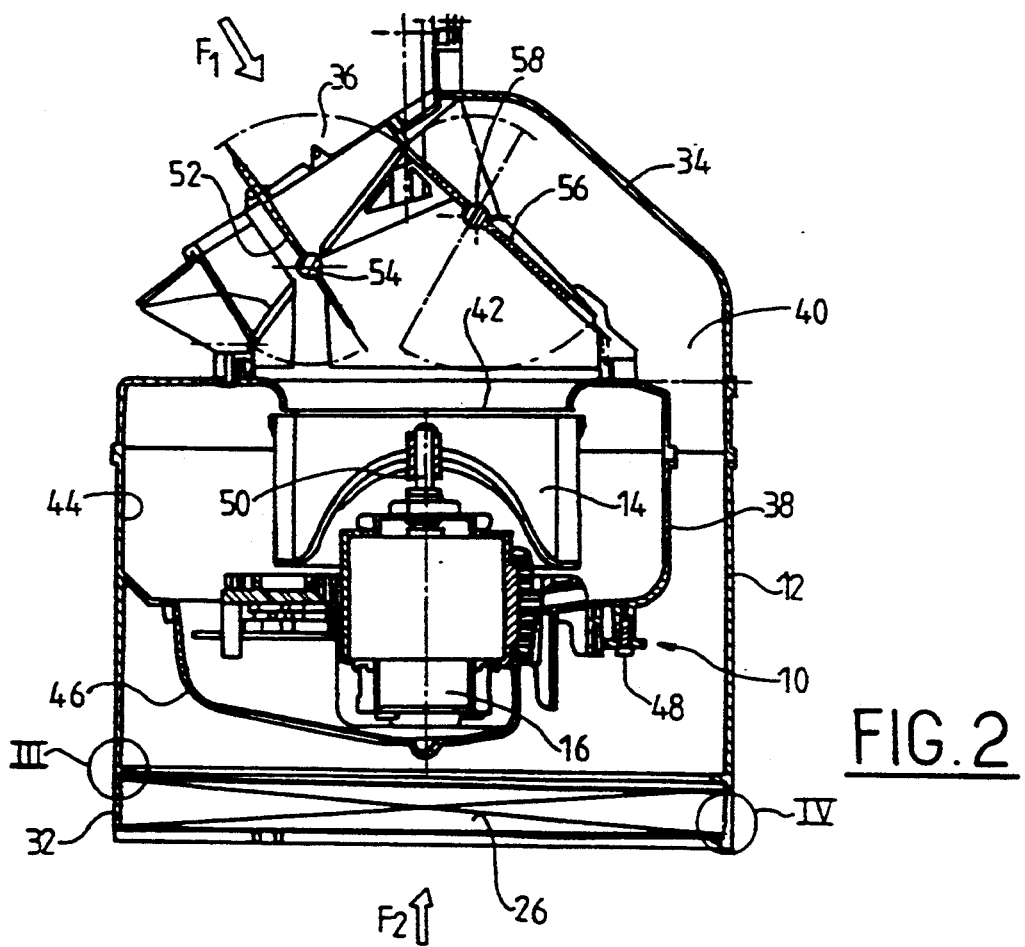
FIG. 2 is a view in longitudinal cross section of a chamber which forms part of an apparatus in accordance with the invention, with an air blower unit mounted within it.

Referring now to FIG. 2, in this embodiment the apparatus includes a chamber 12, which is made in the form of a cylindrical skirt in which the air blower unit 10 is housed. The chamber 12 includes at one of its ends a recycling air inlet 32 for accommodating the deodorant filter 26 as described above. The chamber 12 has at its other end an extension 34 which is formed with a fresh air inlet 36. In this way the chamber is able to receive either fresh air as indicated by the arrow $F_1$, or recycling air as indicated by the arrow $F_2$.

The air blower unit in FIG. 2 comprises a casing 38 in the form of a volute, which is mounted inside the chamber 12 and which defines, with the latter, a communication passage 40. The casing 38 has an air inlet 42 and an air outlet 44 (the latter being open at right angles to the plane of FIG. 2). The casing 38 has a removable base 46 on the side facing towards the recycling air inlet 32 of the chamber 12. The base 46 is secured to the remainder of the volute casing 38 by means of screws 48. The blower rotor 14 and the electric motor 16 are both mounted within the volute casing 38, the rotor 14 being driven by the motor 16 via a drive shaft 50.

Access to the motor 16, for maintenance or repair purposes, is readily obtained by removing, first the deodorant filter 26 and then the base 46.

The apparatus shown in FIG. 2 also includes a regulating valve 52 which is mounted for pivoting movement about an axis 54 for controlling the flow of fresh air from outside the vehicle through the air inlet 36 of the chamber 12, and thence into the air inlet 42 of the casing 38. A second regulating valve 56 is also provided. This is mounted for pivoting movement about an axis 58, and is arranged to control the flow of air entering through the recycling air inlet 32 of the chamber 12 and passing through the communication passage 40, in order to reach the air inlet 42 of the air blower unit. Thus, by adjusting the position of the two valves 52 and 56, the flow of either fresh air or recycling air, or a mixture of both, into the air inlet 42 of the blower unit, can be controlled.

Figure 3:
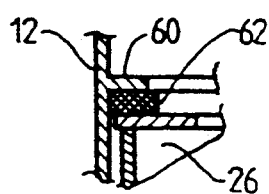
FIG. 3 is a view on a larger scale of the detail indicated at III in FIG. 2.
Figure 4:
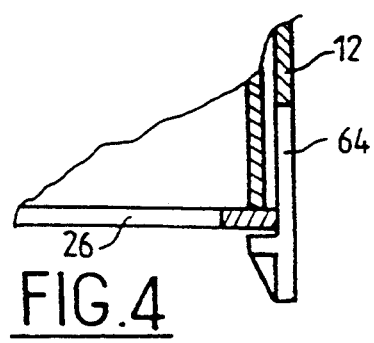
FIG. 4 is a view, again on a larger scale, of the detail indicated at IV in FIG. 2.

Referring now to FIG. 3, the recycling air inlet 32 of the chamber 12 includes a peripheral internal abutment surface 60, which is provided with a seal 62 for cooperation with the deodorant filter 26 when the latter is positioned within the inlet 32. The latter is also provided with at least one snap-fitting hook element 64 (see FIG. 4) for retaining the filter 26 in position.

As already mentioned, the deodorant filter 26 is preferably made in the form of a replaceable cartridge which can easily be positioned and replaced when its absorbent material is saturated. When the cartridge is removed, access can easily be had to the motor of the air blower unit for maintenance or repair.

In another embodiment of the invention (not shown), a suitable sensor can also be provided for automatically controlling a motor for actuating the air inlet adjusting valve or valves.

What is claimed is:

1. Apparatus for heating and/or air conditioning the cabin of a motor vehicle, the apparatus comprising a chamber defining a fresh air inlet and a recycling air inlet, an air blower unit mounted within the chamber, a fresh air admission duct connected to the fresh air inlet of the chamber, a recycling air admission duct connected to the recycling air inlet of the chamber, air flow regulating means associated with the chamber upstream of the air blower unit for adjusting the relative flows of fresh air and recycling air from the respective said air inlets to the air blower unit, and a filter mounted removably in the said recycling air admission duct, on the said recycling air inlet, wherein the air blower unit comprises a casing defining an air inlet and an air outlet of the blower unit, an electric motor, means mounting the electric motor within the casing, a blower rotor in the casing, and means coupling the blower rotor to the motor whereby the latter drives the rotor, the said casing being disposed within the said chamber and being so oriented that the motor is accessible through the recycling air inlet of the said chamber upon removal of the filter.

2. Apparatus according to claim 1, wherein the said chamber defines an internal air passage communicating with both the said recycling air inlet of the chamber and the air inlet of the casing, with the said air flow adjusting means comprising a recycling air regulating valve between the recycling air inlet and the air inlet of the blower unit casing, and a fresh air regulating valve between the fresh air inlet of the chamber and the air inlet of the blower unit casing.

3. Apparatus according to claim 1, wherein the said filter comprises a replaceable cartridge containing an absorbent material of the active carbon type, adapted to fit within the recycling air admission duct of the chamber.

4. Apparatus according to claim 3, wherein the chamber further defines a peripheral internal engagement surface around the recycling air inlet, and retaining means for retaining the cartridge against the recycling air inlet, the apparatus further including a seal between the said engagement surface and cartridge.

5. Apparatus according to claim 4, wherein the said retaining means comprise at least one snap-fit clipping element.

6. Apparatus according to claim 1, further including a particle filter and a deodorant filter arranged in the fresh air admission duct.

* * * * *